(12) United States Patent
Ohara

(10) Patent No.: US 6,962,416 B2
(45) Date of Patent: Nov. 8, 2005

(54) PROJECTION TYPE DISPLAY APPARATUS

(75) Inventor: Toru Ohara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 10/448,541

(22) Filed: May 29, 2003

(65) Prior Publication Data

US 2003/0223049 A1 Dec. 4, 2003

(30) Foreign Application Priority Data

May 31, 2002 (JP) ........................ 2002-159539

(51) Int. Cl.[7] ............................................. G03B 21/14
(52) U.S. Cl. ............................ 353/70; 353/101; 353/85
(58) Field of Search ............................. 353/69, 70, 85, 353/101, 122

(56) References Cited

U.S. PATENT DOCUMENTS

| | | | | |
|---|---|---|---|---|
| 5,136,397 A | * | 8/1992 | Miyashita | 348/748 |
| 5,455,647 A | * | 10/1995 | Fujiwara | 353/101 |
| 6,416,186 B1 | * | 7/2002 | Nakamura | 353/69 |
| 6,450,647 B1 | * | 9/2002 | Takeuchi | 353/69 |
| 6,540,365 B1 | * | 4/2003 | Fujiwara et al. | 353/69 |
| 6,592,228 B1 | * | 7/2003 | Kawashima et al. | 353/101 |
| 6,686,973 B2 | * | 2/2004 | Su | 348/745 |
| 2002/0122161 A1 | * | 9/2002 | Nishida et al. | 353/70 |
| 2003/0068094 A1 | * | 4/2003 | Kimura et al. | 382/274 |

FOREIGN PATENT DOCUMENTS

| | | |
|---|---|---|
| JP | 1099035 | 4/1989 |
| JP | 4-338707 | 11/1992 |
| JP | 8-9309 | 1/1996 |
| JP | 2001-186538 | 7/2001 |

* cited by examiner

*Primary Examiner*—William C. Dowling
(74) *Attorney, Agent, or Firm*—Morgan & Finnegan, L.L.P.

(57) ABSTRACT

This specification discloses a projection type display apparatus for projecting an image onto the surface of a screen, including an image display device illuminated by illuminating light from a light source and for displaying an image thereon, a projecting optical system for projecting the image from the image display device onto the surface of the screen, a condition detection device for detecting a condition related to the image, an adjusting device for adjusting the condition of the image in conformity with the output of the condition detection device, an operation device for effecting the ON/OFF of the power source of the projection type display apparatus, and a controller for causing the condition detection device to be operated and also, limiting the inputting of an input image signal to the image display device when the power source of the projection type display apparatus is switched on by the operation device.

17 Claims, 11 Drawing Sheets

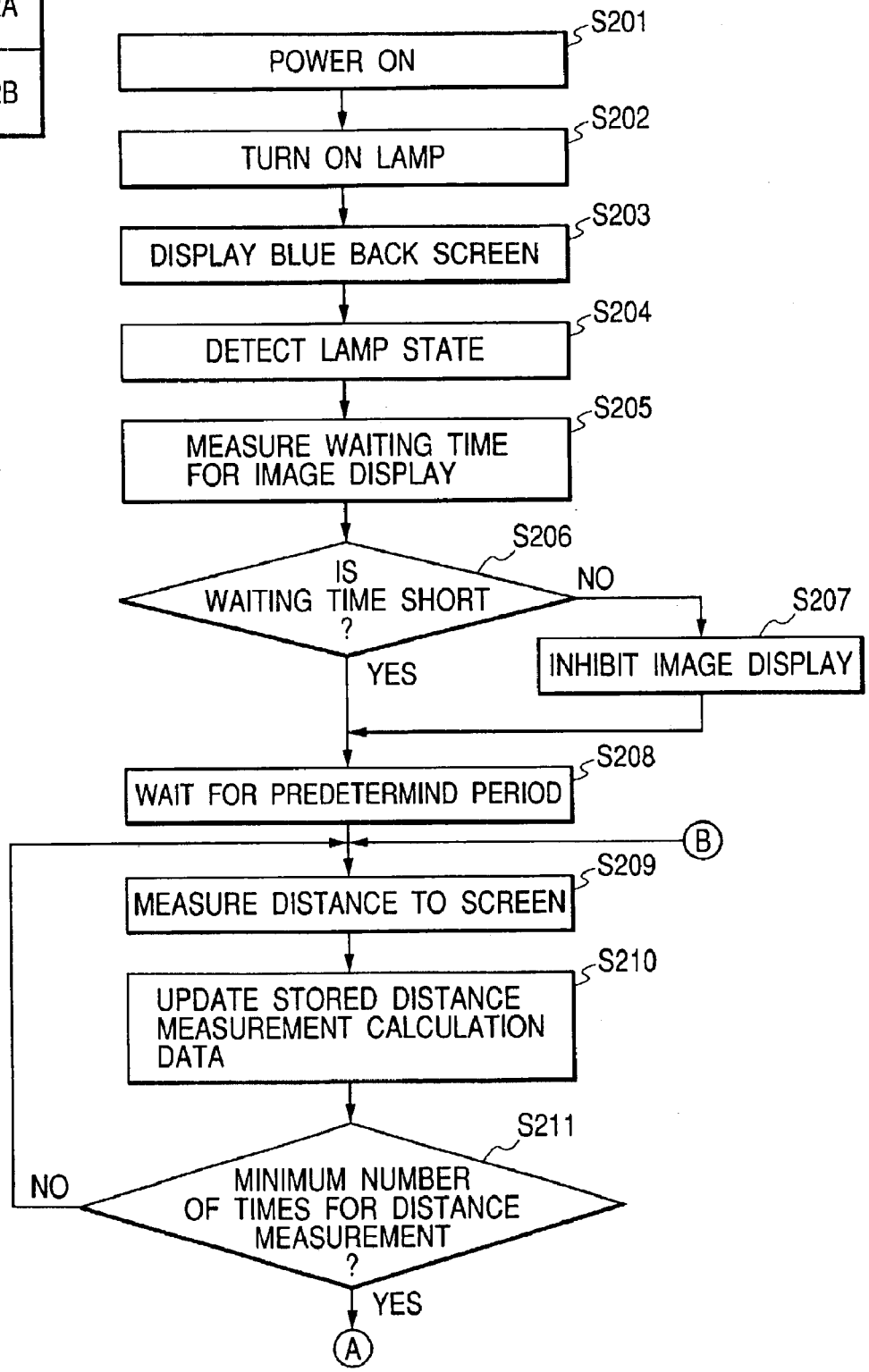

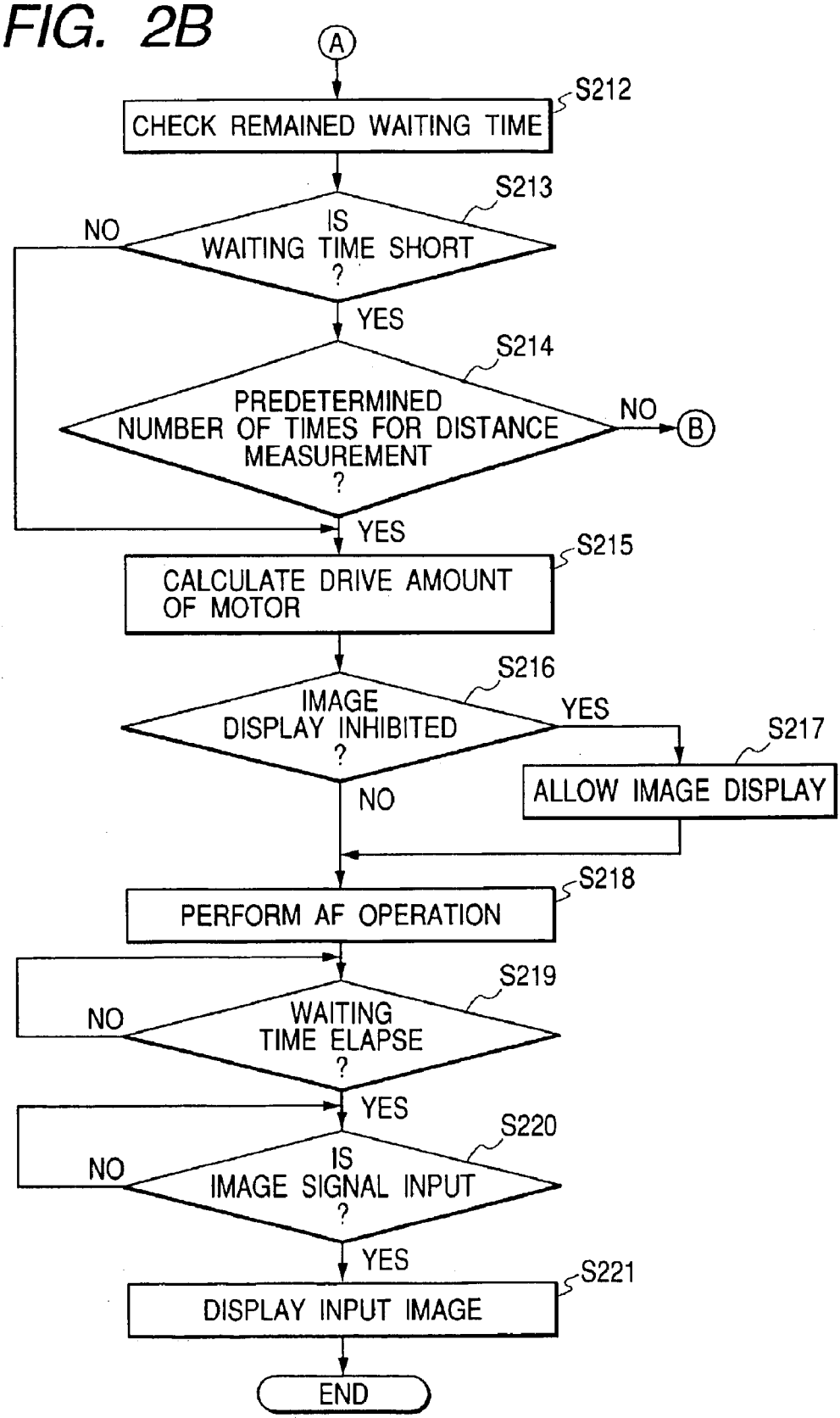

PROJECTION TYPE DISPLAY APPARATUS

BACKGROUND OF THE INVENTION

1. Field of the Invention

This invention relates to a projection type display apparatus such as a liquid crystal projector.

2. Related Background Art

There is a projector carrying an auto focusing apparatus thereon. This auto focusing apparatus is designed such that an operator operates (pushes) a focusing switch, whereby a focusing operation is performed and the focus of an image projected onto a screen is adjusted. Also, as auto focusing (AF) techniques, there are known an active methods of measuring the propagation time of an ultrasonic signal to thereby find a distance and effect AF (Japanese Patent Application Laid-Open No. 4-338707), and of projecting infrared light and receiving the reflected light thereof to thereby find a distance by the principle of trigonometrical distance measurement and effect AF, and a passive method of reading the contrast of brightness on a screen by a pair of light receiving line sensors, and obtaining the correlative values of respective pixel outputs to thereby find a distance and effect AF, etc.

Also, in the projector, so-called trapezoidal distortion in which distortion occurs onto an image is caused when the direction of a normal to the surface of a screen and the direction of the optical axis of projected light deviate from each other. When for example, as shown in FIG. 9 of the accompanying drawings, a projector main body 2 is installed with an elevation from horizontal with respect to a screen 1, an image projected onto the screen 1 becomes distorted as indicated by a projected image 3. As a proposition for automatically effecting the correction of such trapezoidal distortion, there is a projector described in Japanese Patent Application Laid-Open No. 8-9309. In this reference, the distances among at least three points on the projector and the screen are measured to thereby detect the inclination of the surface of the screen, and such image data as will offset the distortion of a displayed image is projected to thereby make automatic trapezoidal distortion correction possible. Also, in Japanese Patent Application Laid-Open No. 2001-186538, there is proposed a display apparatus in which the distortion of an image on the surface of a screen is calculated from the projection angle of projected light and the installation angle of a projector main body to thereby automatically correct trapezoidal distortion.

Here, the automatic focus adjusting function realized by the various focus detecting methods as described above is executed by operating a focusing switch, and the automatic trapezoidal distortion correcting function is also executed by operating a correction switch. Operating the operation switch of each function leads to the problem that a user's operation is cumbersome and the operability of a displaying apparatus is spoiled. Also, when the focus adjusting function and the trapezoidal distortion correcting function are being performed, there is the problem that an image of which the focus is blurred (which is out of focus) or an image of which the shape is distorted is projected and an image of low quality is displayed for a long time until a good projected image is displayed.

SUMMARY OF THE INVENTION

The present invention has as its object to provide a projection type display apparatus in which after the closing of the power source switch of the apparatus, a focus adjusting operation, a trapezoidal distortion correcting operation, or a focus adjusting operation and a trapezoidal distortion correcting operation can be automatically performed to thereby improve the operability of the apparatus, and the display of an unnecessary image during the focus adjusting operation or the trapezoidal distortion correcting operation can be effected for a short time or cannot be effected.

In order to achieve the above object, one aspect of the present invention is a projection type display apparatus for projecting an image onto the surface of a screen, characterized by comprising:

an image display device illuminated by illuminating light from a light source and for displaying an image thereon;

a projecting optical system for projecting the image from the image display device onto the surface of the screen;

a condition detection device for detecting a condition related to the image;

an adjusting device for adjusting the condition of the image in conformity with the output of the condition detection device;

an operation device for effecting the ON/OFF of the power source of the projection type display apparatus; and a controller for causing the condition detection device to be operated and also, limiting the inputting of an input image signal to the image display device when the power source of the projection type display apparatus is switched on by the operation device.

In the above-described apparatus, it is preferable that the condition detection device be a distance measuring device for measuring the distance between the screen and the projection type display apparatus, and the adjusting device be a driving mechanism for driving at least a part of the projecting optical system in the direction of the optical axis thereof in conformity with an output from the distance measuring device.

Also, in the above-described apparatus, it is preferable that the condition detection device be an angle detecting device for detecting the installation angle of the projection type display apparatus, the adjusting device be an image processing device for converting and processing the input image signal in conformity with an output from the angle detecting device, and the image processing device convert and process the input image signal so as to correct the trapezoidal deformation of the image projected onto the screen.

Also, in the above-described apparatus, it is preferable that the condition detection device be a distance measuring device for measuring the distance between the screen and the projection type display apparatus, and an angle detecting device for detecting the installation angle of the projection type display apparatus, the adjusting device be a driving mechanism for driving at least a part of the projecting optical system in the direction of the optical axis thereof in conformity with an output from the distance measuring device, and an image processing device for converting and processing the input image signal in conformity with an output from the angle detecting device, and the image processing device convert and process the input image signal so as to correct the trapezoidal deformation of the image projected onto the screen.

Also, in the above-described apparatus, it is preferable that the controller input a predetermined setting signal to the image display device when it is limiting the inputting of the input image signal to the image display device, the condition detection device be a contrast detecting device for detecting the contrast of the image on the screen, and the adjusting device be a driving mechanism for driving at least a part of the projecting optical system in the direction of an optical axis thereof in conformity with an output from the contrast detecting device.

Also, in the above-described apparatus, it is preferable that the controller input a predetermined setting signal to the image display device when it limits the inputting of the input image signal to the image display device, the condition detection device be a phase difference detecting device for detecting the phase difference of the image on the screen, and the adjusting device be a driving mechanism for driving at least a part of the projecting optical system in the direction of the optical axis thereof in conformity with an output from the phase difference detecting device.

Further, in order to achieve the above object, a further aspect of the present invention is a projection type display apparatus for projecting an image onto the surface of a screen, characterized by comprising:

- an image display device illuminated by illuminating light from a light source, and for displaying an image thereon;
- a light source condition detection device for detecting any change in the condition of the light source;
- a waiting time measuring device for finding a waiting time until the light source assumes a predetermined stable condition on the basis of the output of the light source condition detection device;
- a projecting optical system for projecting the image from the image display device onto the surface of the screen;
- a condition detection device for detecting a condition related to the image;
- an adjusting device for adjusting the condition of the image in conformity with the output of the condition detection device;
- an operation device for effecting the ON/OFF of the power source of the projection type display apparatus; and
- a controller for finding, when the power source of the projection type display apparatus is switched on by the operation device, the waiting time until the light source assumes the predetermined stable condition by the waiting time measuring device on the basis of the output of the light source condition detection device, and causing the condition detection device to be operated during the waiting time.

In the above-described apparatus, it is preferable that the condition detection device be a distance measuring device for measuring the distance between the screen and the projection type display apparatus, and the adjusting device be a driving mechanism for driving at least a part of the projecting optical system in the direction of the optical axis thereof in conformity with an output from the distance measuring device.

Also, in the above-described apparatus, it is preferable that the condition detection device be an angle detecting device for detecting the installation angle of the projection type display apparatus, the adjusting device be an image processing device for converting and processing the input image signal in conformity with an output from the angle detecting device, and said image processing device convert and process the input image signal so as to correct the trapezoidal deformation of the image projected onto the screen.

Also, in the above-described apparatus, it is preferable that the condition detection device be a distance measuring device for measuring the distance between the screen and the projection type display apparatus, and an angle detecting device for detecting the installation angle of the projection type display apparatus, the adjusting device be a driving mechanism for driving at least a part of the projecting optical system in the direction of the optical axis thereof in conformity with an output from the distance measuring device, and an image processing device for converting and processing the input image signal in conformity with an output from the angle detecting device, and the image processing device convert and process the input image signal so as to correct the trapezoidal deformation of the image projected onto the screen.

Also, in the above-described apparatus, it is preferable that the controller limit the inputting of the input image signal to the image display device during the waiting time.

Further, in the above-described apparatus, it is preferable that the controller input a predetermined setting signal to the image display device when it is limiting the inputting of the input image signal to the image display device, the condition detection device be a contrast detecting device for detecting the contrast of the image on the screen, and the adjusting device be a driving mechanism for driving at least a part of the projecting optical system in the direction of the optical axis thereof in conformity with an output from the contrast detecting device.

Further, in the above-described apparatus, it is preferable that the controller input a predetermined setting signal to the image display device when it is limiting the inputting of the input image signal to the image display device, the condition detection device be a phase difference detecting device for detecting the phase difference of the image on the screen, and the adjusting device be a driving mechanism for driving at least a part of the projecting optical system in the direction of the optical axis thereof in conformity with an output from the phase difference detecting device.

Further, in the above-described apparatus, it is preferable that when the controller is limiting the inputting of the input image signal during the waiting time, if the waiting time is exceeded before an output is obtained from the condition detection device, the controller limit the inputting of the input image signal to the image display device until the output is obtained, and allow the inputting of the input image signal to the image display device when the output is obtained.

Further, in the above-described apparatus, it is preferable that when the controller is limiting the inputting of the input image signal during the waiting time, if the waiting time is exceeded before an output from the condition detection device is obtained, the controller limit the inputting of the input image signal to the image display device until the output is obtained, allow the inputting of the input image signal to the image display device when the output is obtained, and adjust the condition of the projected image in conformity with the output through the adjusting device.

Also, in the above-described apparatus, it is preferable that the light source condition detection device be a temperature change detecting device for detecting any change in the temperature of the light source, and the waiting time measuring device foresee and calculate the time until the light source reaches a stable temperature, on the basis of a plurality of informations about a temperature change during a predetermined period, from the temperature change detecting device, thereby finding the waiting time.

Further, in the above-described apparatus, it is preferable that the temperature change detecting device serve also as a brightness change detecting device.

Other constructions and objects of the present invention will become apparent from the following description of some embodiments of the invention which will be described later.

BRIEF DESCRIPTION OF THE DRAWINGS

FIG. 2 is comprised of FIGS. 2A and 2B illustrating flow charts showing the operation of the projector apparatus which is the first embodiment of the present invention.

DETAILED DESCRIPTION OF THE PREFERRED EMBODIMENTS (First Embodiment)

Some embodiments of the present invention will hereinafter be described with reference to the drawings.

Figure 1:
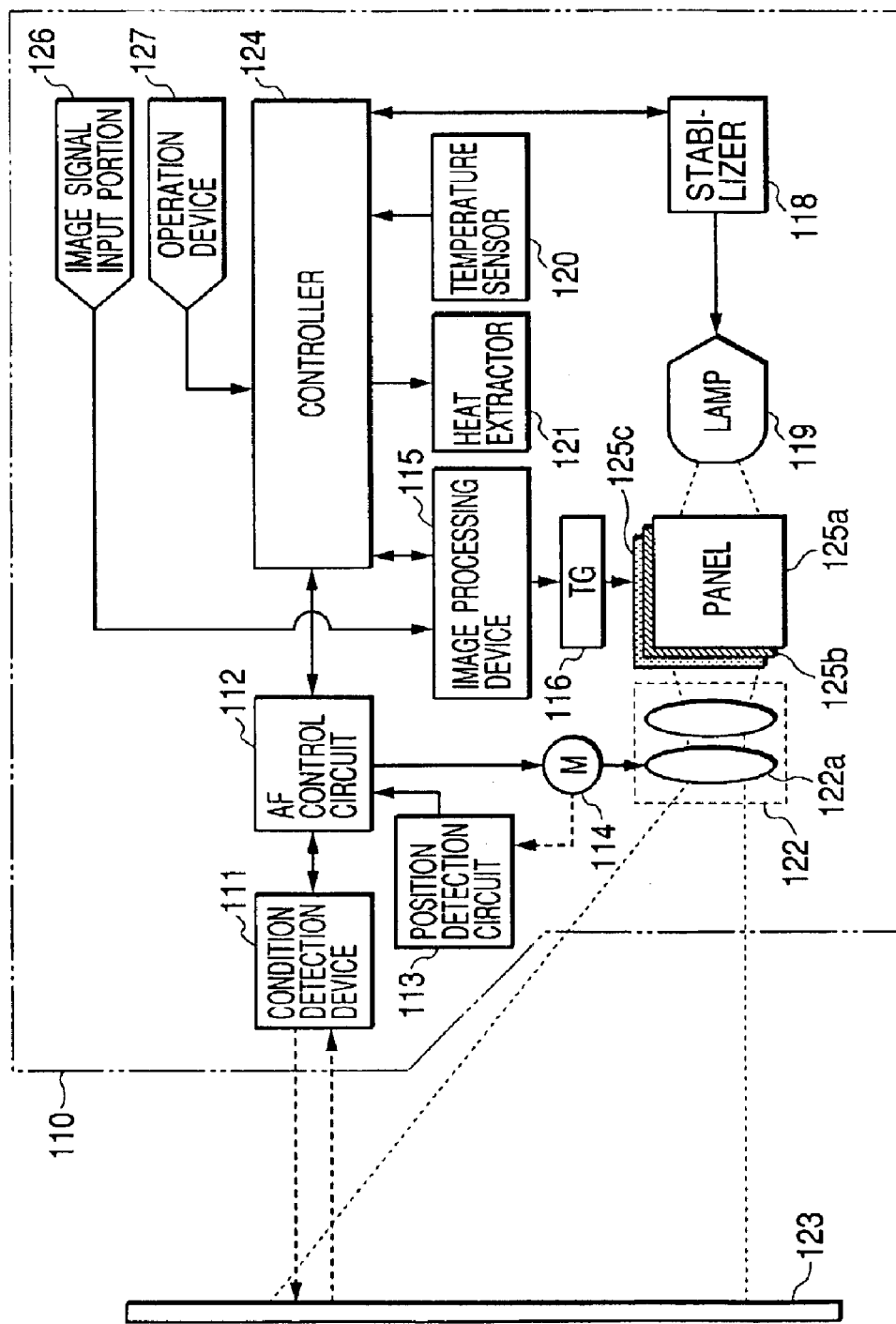
FIG. 1 is a block diagram showing the construction of a projector apparatus which is a first embodiment of the present invention.
Figure 3A:
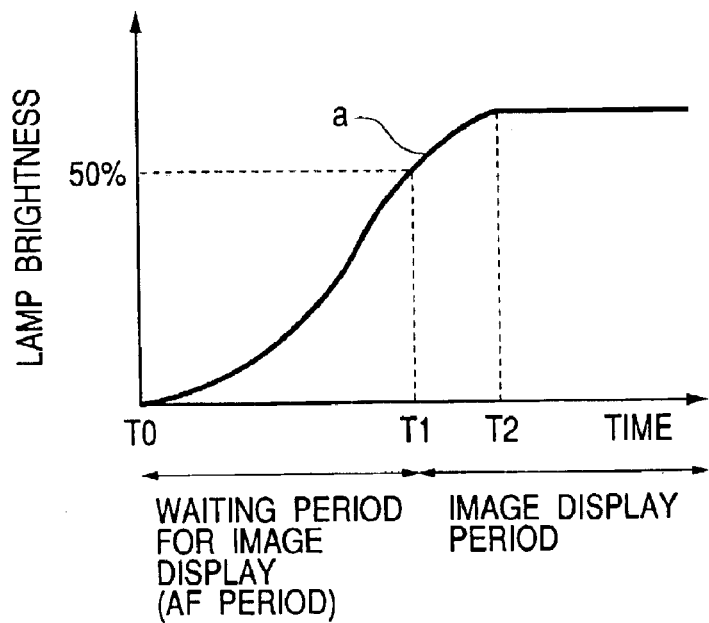
FIGS. 3A and 3B are graphs for illustrating changes in the brightness and temperature of the lamp of the above-mentioned projector apparatus.
Figure 3B:
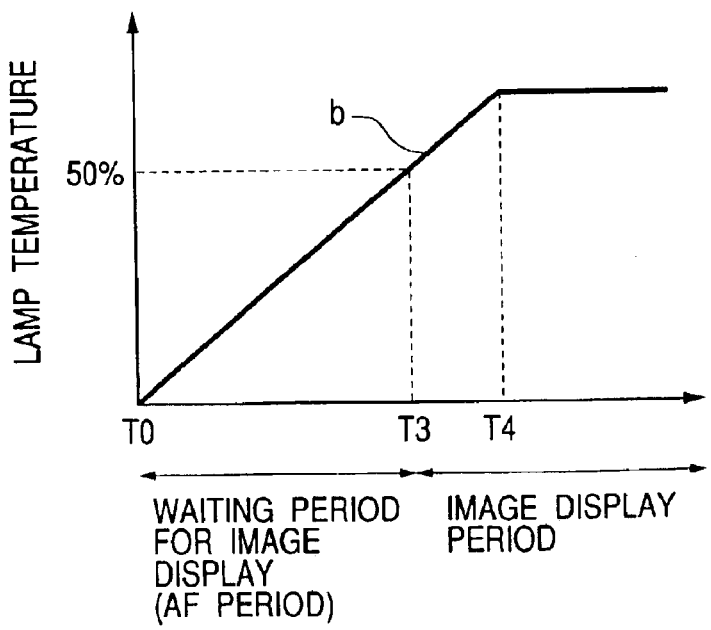
Figure 4A:
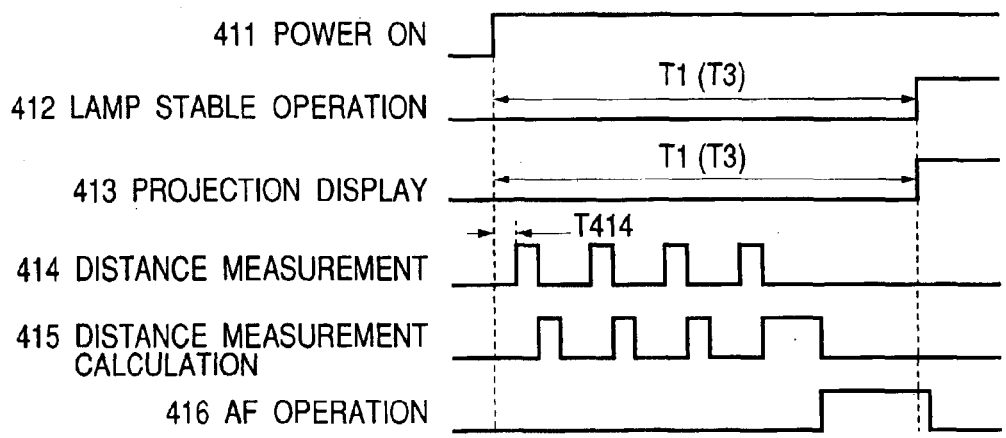
FIGS. 4A and 4B are timing charts showing the operation of the projector apparatus which is the first embodiment of the present invention.
Figure 4B:
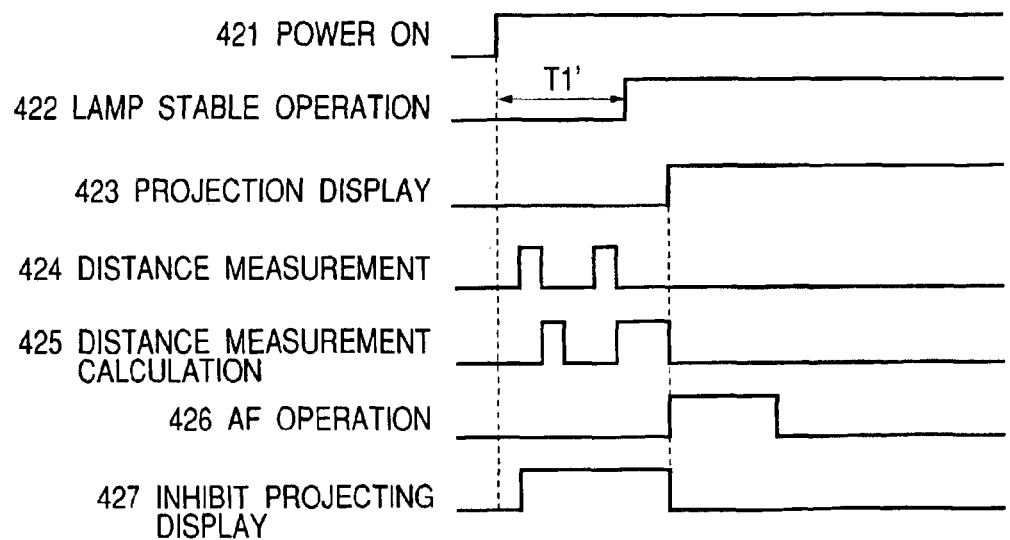

FIG. 1 is a block diagram showing the construction of a projector according to a first embodiment of the present invention, FIGS. 2A and 2B is a flow chart showing the control algorithm of the present invention, FIGS. 3A and 3B are graphs for illustrating changes in the state of a light source, and FIGS. 4A and 4B are timing charts showing the control timing of the present invention.

FIG. 1 schematically shows the construction of a color liquid crystal projector apparatus using a liquid crystal panel as an image display device, and projecting image information based on liquid crystal panels 125a, 125b and 125c onto a screen 123 by an optical system 122.

In FIG. 1, the reference numeral 111 designates a condition detection device for detecting a condition related to an image to the screen 123. In the present embodiment, as an example of the condition detection device 111, use is made of a distance measuring sensor for measuring the distance (set condition) between the projector apparatus 110 and the screen 123. As the distance measuring sensor 111, use is made of an ultrasonic distance measuring sensor comprised, for example, of an ultrasonic transmitting portion oscillating a predetermined resonance frequency vibration and an ultrasonic receiving portion for detecting the predetermined resonance frequency vibration by a piezoelectric member. The reference numeral 112 denotes an AF control circuit comprised of a microcomputer. The AF control circuit 112 finds distance information to the screen 123 from the delay of the propagation time of an ultrasonic transmission time and an ultrasonic reception time obtained from the distance measuring sensor 111. The AF control circuit 112 calculates from the distance information the desired in-focus position of a focusing lens 122a in the optical system 122. The AF control circuit 112 reads the current stop position information of the focusing lens 122 from a position detection circuit (encoder) 113, finds the amount of movement of the focusing lens 122a from the difference between the stop position information and the calculated in-focus position (target position), and drives a motor 114 so as to locate the focusing lens 122a at the target position. The AF control circuit 112, the position detection circuit 113 and the motor 114 together constitute an adjusting device.

The reference numeral 119 denotes a light source (illuminating lamp) for illuminating the liquid crystal panels 125a, 125b and 125c, and as this light source, use is made of a high voltage discharge lamp such as a metal halide lamp which is high in color temperature and color rendering property and which is of high light emitting efficiency and capable of effecting high-brightness illumination.

The reference numeral 118 designates a stabilizer for driving the illuminating lamp 119, and it generates a high voltage required to turn on the illuminating lamp 119 and also, keeps the electric power constant to thereby stabilize the brightness of the illuminating lamp 119.

The reference numeral 121 denotes a heat extractor for the illuminating lamp 119, and it is comprised, for example, of a cooling fan for exhausting the generated heat of the illuminating lamp 119 to the outside.

The reference numeral 120 designates a temperature sensor disposed near the illuminating lamp 119 for measuring the heat-generating temperature of the illuminating lamp 119.

The reference numeral 126 denotes an image signal input portion for causing image display signals (hereinafter referred to as the "image signals") such as an image signal and a sound signal outputted from an image information supplying apparatus (such as a personal computer, a television, a video or a DVD player), not shown, to be inputted into the projector apparatus 110. The reference numeral 115 designates an image processing device (image processing circuit) including a decoder for synchronously separating the image signals inputted from the image signal input portion 126, a frame memory and a scan converter, and further including a blue back generating circuit, an on-screen display (OSD) circuit for displaying characters, and an image signal switch for switching the image signals and a blue back signal, and effecting digital processing such as the color correction and distortion correction of the image signals.

The reference numeral 125 (125a, 125b, 125c) denotes liquid crystal panels for respective color lights which are image display devices, and they display the image signals after image processing correspondingly, for example, to the respective colors R, G and B. The reference numeral 116 designates a timing generator (TG) circuit for generating a driving signal for each liquid crystal panel 125.

Also, the optical system (projection lens) 122 combines the images on the liquid crystal panels 125a, 125b and 125c by the utilization of a color combining system (not shown) or the like and projects them onto the screen 123. In the case of a three-plate type color liquid crystal projector, an optical system on an illuminating side including the illuminating lamp 119 has a color separating system (not shown) and design is made such that the liquid crystal panels 125 are illuminated by respective color lights. Also, the optical system (projecting optical system) 122 has a color combining system (not shown) including a dichroic prism, a dichroic mirror or the like.

The reference numeral 117 denotes an operation device (operation portion) having a power source switch for effecting the ON/OFF of a power source, an AF switch for performing an AF operation, a focusing operation switch for performing a power focusing operation, an adjusting switch for performing an optical adjusting operation such as a zooming operation, an image adjusting operation portion for effecting image adjustment such as the adjustment of the color, brightness or the like of the image, and a changeover switch for changing over the connected state of the image signal input portion 126, etc.

The reference numeral 124 designates a controller (control circuit) which is an image projection controller, and the controller 124 executes the control of the image processing device 115 including the optical adjusting operation of the AF control circuit 112, illumination control such as the turning-on and turning-off of the illuminating lamp 119, the adjustment of image display timing, color balance, etc., and the control of the operation of each function of the entire projector apparatus 110 such as the operation of the heat extractor 121 in the projector apparatus 110, in conformity with the operations of the respective switches of the operation device 117.

The specific operation of the projector according to the present embodiment will now be described with reference to FIGS. 2A, 2B, 3A, 3B, 4A and 4B.

When in FIGS. 2A and 2B, the power source switch of the operation device 117 is closed (power on) (step (hereinafter referred to as S) 201), the controller 124 is activated, and the controller 124 operates the stabilizer 118, generates a high lamp turning-on voltage necessary to turn on the illuminating lamp 119, and applies this voltage to the electrode of the lamp, whereby the turning-on of the lamp is started (S202). Thereafter, a blue back signal is selected in the image processing device 115 and this blue back signal is outputted to the liquid crystal panel 125, and during a waiting time till the display of an input image, the liquid crystal panel 125 displays a blue back screen (S203). Next, the state of the illuminating lamp 119 is detected (S204), and the waiting time till the display of the input image is measured (S205). More specifically, the output of the temperature sensor 120 provided near the illuminating lamp 119 is detected for a predetermined period, and from the inclination of the temperature rise of the obtained output, a time until a predetermined temperature (stable temperature) is reached is calculated to thereby measure the waiting time till the display of the input image (S204, S205). Here, the above-mentioned waiting time may be a predetermined time (tens of seconds, e.g. 30 seconds) having taken the brightness stable state of the illuminating lamp 119 into account.

It is the feature of the present embodiment to detect an insufficient period (=the waiting period) during which the state of the illuminating lamp 119 is a state in which the quantity of light is small, and perform distance measurement or the AF operation during this waiting period till the display of the input image.

Reference is now had to FIGS. 3A and 3B to describe the relation between the waiting time till the display of the input image and the brightness and temperature of the lamp.

FIG. 3A shows the brightness change characteristic "a" from the start (T0) of the turning-on of the illuminating lamp 119 until the brightness of the illuminating lamp 119 becomes high with the lapse of time and soon reaches a saturation point (T2). The display of the input image is unnecessary when the brightness of the illuminating lamp 119 is insufficient, and by the time (T1) when the brightness of e.g. about 50% before the saturation point (T2) of brightness is reached is achieved, a predetermined non-input image such as the blue back or a character (an image by a set image signal preset on the image processing device 115) is projected, and after predetermined brightness (T1) has been reached, the display of the input image by the image signal from the image signal input portion 126 is started.

FIG. 3B shows the temperature change characteristic "b" from the start (T0) of the turning-on of the illuminating lamp 119 until the temperature of the vicinity of the illuminating lamp 119 rises with the lapse of time, is cooled by the heat extractor 121 such as a cooling fan and reaches a saturation point (stable temperature) (T4). As can be understood from FIGS. 3A and 3B, the brightness change characteristic "a" and the temperature change characteristic "b" are in a substantially equal relation and therefore, the detection of the brightness change of the illuminating lamp 119 can be substituted by measuring (detecting) the temperature of the vicinity of the illuminating lamp 119. Accordingly, the display of the input image is unnecessary when the temperature of the illuminating lamp 119 is insufficient, and by the time (T3) when the temperature of e.g. about 50% before predetermined brightness, for example, the saturation point (T4) of temperature is reached is achieved, the predetermined non-input image such as the blue back or a character is projected, and after a predetermined temperature (T3) has been reached, the display of the input image by the image signal from the image signal input portion 126 is started.

Further, the timing charts of FIGS. 4A and 4B show the timing at which from the closing (411) of the power source switch of the operation device 117, and the controller 124 reads the output signal of the temperature sensor 120, judges the waiting time till the stabilization of the brightness of the illuminating lamp 119 (412), and starts the display of the input image (413).

Next, turning back to the flow chart of FIGS. 2A and 2B, as described above, at S205, the waiting time is found by the controller 124, whereafter the controller 124 starts to count down the waiting time.

Next, whether the waiting time found by the controller 124 is a sufficiently long time relative to the time of the operation of measuring the distance by the distance measuring sensor 111 is confirmed (S206). If the waiting time is a time longer than the time necessary for the distance measuring operation, the distance measuring sensor 111 and the AF control circuit 112 take an AF waiting time (a predetermined time) of several seconds (S208). This is because if it is the first closing of the power source switch after the installation of the projector apparatus 110, the possibility of changing the installed position of the projector apparatus is high and therefore it is better to begin the distance measuring operation after the installed position has been decided. FIG. 4A shows the timing at which distance measurement (414) is started after the lapse of a predetermined time (T414) from the closing of the power source switch.

Turning back to the flow chart of FIGS. 2A and 2B, if at S206, it is confirmed that the waiting time is a short time equal to or less than an AF waiting time (T414) shown in FIG. 4A, the controller 124 fixes the input signal changeover switch (not shown) of the image processing device 115 to a non-input image signal output side until the display of the input image after the termination of the distance measurement is allowed, inhibits the projection of the input image (limits (inhibits) the inputting of the image signal from the image signal input portion 126), and continues the projection of a predetermined non-input image such as the blue back or a character (S207). Thereafter, the controller takes an AF waiting time of several seconds before the distance measurement (S208).

Next, the AF control circuit 112 executes the measurement of the distances between the projector apparatus 110 and the screen 123 by the distance measuring sensor 111 such as the ultrasonic transmitter and the receiver (S209), and stores the result of the measurement (distance information) in the memory (not shown) of the AF control circuit 112. Further, it repeats the distance measurement, averages and calculates distance measurement data, and updates the value of the distance measurement data improved in reliability on the memory (S210). Thereafter, whether a minimum number of times for distance measurement has been reached is confirmed (S211), and if the minimum number of times for distance measurement is not reached, return is made to S209. A minimum number of repetition times for distance measurement is preset, and for example, distance measurement is repeated four times. If at S211, the minimum number of times for distance measurement is reached, next the remainder of the waiting time is again read out from the controller 124 (S212), and the remainder of the waiting time is confirmed (S213), and if there is a remaining time sufficient to further execute distance measurement, whether the operation of measuring the distance to the screen 123 has reached a preset number of times for distance measurement (e.g. 30 times) is further confirmed (S214). If it has not reached the set number of times for distance measurement, return is made to S209, where the distance measuring operation is performed, and the updating of the distance measurement data is effected (S210). The operations of S209 to S214 are repeated until the number of times for distance measurement satisfies e.g. 30 times, whereby the distance measurement data is further averaged and calculated, and the value of the distance measurement data more improved in reliability is updated on the memory.

Soon the remainder of the input image display waiting time becomes null (S213) or the number of times for the measurement of the distance to the screen 123 is satisfied (S214), whereupon the distance measuring operation is terminated, a correction value inherent to the lens is added on the basis of reliable distance measurement data averaged from on the memory, and the amount of driving of the AF driving motor 114 is calculated from the positional information of the lens from the position detection circuit 113 (S215).

Next, whether the display of the image signal from the image signal input portion 126 is inhibited is confirmed (S216). This is for confirming whether the input signal changeover switch of the image processing device 115 has been fixed to a non-input signal output side to thereby inhibit the projection of the input image when the time till the input image display waiting time is a short time equal to or less than the AF waiting time (T414). When the projection has been inhibited, the inhibition of the projection of the input image is released and a projection allowing signal for allowing the projection of the input image is transmitted to the image processing device 115. Thereby, the image processing device 115 changes over the input signal changeover switch to thereby change over from a state in which the blue back signal set at S203 is outputted to a state in which the image signal from the image signal input portion 126 is inputted (S217), whereafter advance is made to S218. Also, when at S216, a state in which image display is not inhibited has been detected (this case is the display state of a blue back image in which the image display of the image signal from the image signal input portion 126 is not effected), advance is made to S218.

Next, the amount of driving previously calculated and the driving direction are given to the AF driving motor 114 to thereby move the focusing lens 122a in the in-focus direction and execute the AF operation (focus adjusting operation) (S218).

The state of things hitherto will be further described with reference to the timing charts of FIGS. 4A and 4B.

FIG. 4A shows the manner in which when the temperature of the illuminating lamp 119 after the closing of the power source switch of the apparatus is low and there is a sufficient time (tens of seconds, e.g. 30 seconds) until the input image is displayed, AF driving is effected after a predetermined number of distance measuring operations, whereafter the input image by the image signal from the image signal input portion 126 is displayed.

It represents a timing chart until after the closing of the power source switch (411), the brightness or temperature of the illuminating lamp 119 is detected (412), the waiting time until the input image is projected and displayed is measured (T1), a predetermined number of times for distance measurement (414) and distance measurement calculation (415) are repeated, and during AF driving (416), the input image is projected and displayed (413).

Also, FIG. 4B shows the manner in which even when the temperature of the illuminating lamp 119 after the closing of the power source switch of the projector apparatus is high and the input image can be displayed within a short time, AF driving is started and the input image is displayed after the execution of a minimum predetermined number of distance measuring operations.

It represents a timing chart in which after the closing of the power source switch (421), the brightness or temperature of the illuminating lamp 119 is detected (422), the waiting time until the input image is projected and displayed is measured (T1'), the projection of the input image is once inhibited (427), then a minimum number of distance measuring operations (424) and distance measurement calculation (425) are repeated, and the projection of the input image is started and AF driving (426) is effected.

Turning back to the flow chart of FIGS. 2A and 2B, if at S216, a state in which image display is not inhibited is detected, when at S218, the AF operation is being executed (the AF operation may be completed), the controller 124 confirms whether the waiting time till the display of the input image has been up (S219), and if the waiting time is up, whether there is the input of the image signal from the image signal input portion 126 is confirmed (S220), and if there is the input of the image signal, the controller 124 changes over the input signal changeover switch of the image processing device 115 to thereby change over from a state in which the blue back signal set at S203 is outputted to a state in which the image signal from the image signal input portion 126 is inputted, and the image of that image signal is projected (S221).

Also, if at S216, image display is inhibited, at S217, changeover is made to a state in which the image signal from the image signal input portion 126 is inputted, the image of that image signal is displayed, at S218, the AF operation is started. When at S218, the AF operation is being executed, the controller 124 confirms whether the waiting time till the display of the input image has been up (S219), and if the waiting time is up (this case is a state in which there is no waiting time from S206), whether there is the input of the image signal from the image signal input portion 126 is confirmed (S220), and if there is the input of the image signal (in this case, a state in which the image signal is inputted from the time of S217), the image of the image signal is projected (S221).

In the above-described operation, at S215, the amount of driving of the lens may be found, and then the AF operation of S218 may be performed and completed (in-focus state), whereafter the operations of S216 and S217 for the confirmation of the inhibition and the release of the inhibition of the image display may be performed.

Thus, in the above-described embodiment, design is made such that after the closing of the power source switch of the projector apparatus, the state of the illuminating lamp is detected and if the temperature (brightness) of the illuminating lamp is low and the waiting time until the illuminating lamp assumes a stable state is long (a time for which the distance measuring operation can be sufficiently performed), the distance measuring operation is performed during that waiting time, and if the temperature (brightness) of the illuminating lamp is high and the waiting time until the illuminating lamp assumes the stable state is short (a time for which the distance measuring operation cannot be performed), the input display of the image signal is inhibited (limited) and during the period of this inhibition, the distance measuring operation is performed, and the image of the image signal inputted after the completion of the focus adjusting operation or during the focus adjusting operation is projected and displayed, and therefore, after the closing of the power source switch of the projector apparatus, the focus adjusting operation can be automatically performed and the operability of the projector apparatus can be improved. Also, the display of an unnecessary image during the focus adjusting operation can be effected for a short time or cannot be effected, and the user can appreciate a good image in a short time after the closing of the power source switch of the projector apparatus.

While in the above-described embodiment, a distance measuring sensor for measuring the distance (set state) between the projector apparatus 110 and the screen 123 is used as an example of the condition detection device for detecting a condition related to an image to the screen 123, and the distance measuring sensor is of a construction for finding the distance from the propagation time of an ultrasonic signal, use may be made of a sensor of a construction for finding the distance by trigonometrical distance measurement using infrared light.

Also, while in the above-described embodiment, description has been made of a construction for finding the distance between the screen and the projector apparatus by the distance measuring sensor 111, and driving the projecting optical system in conformity with the distance information to thereby adjust the focus state, a construction for detecting the focus state by the use of an area including the brightness difference between the image on the screen and the screen (a portion on which there is no image) may be adopted as the condition detection device for detecting a condition related to the image to the screen 123. In this case, as the condition detection device, use can be made of a detection device of a contrast type which evaluates the contrast of an area including the brightness difference between the image on the screen and the screen and detects the focus state, and the projecting optical system can be moved in the direction of the optical axis thereof to a position at which the contrast becomes maximum by the adjusting device to thereby bring about an in-focus state.

Also, as the condition detection device, use can be made of a detection device of a phase difference detection type which receives an area including the brightness difference between the image on the screen and the screen by a pair of photosensors, and finds the distance between the projection type display apparatus and the screen from the phase difference between the two images thereof, and on the basis of the obtained distance information, the projecting optical system can be moved in the direction of the optical axis thereof by the adjusting device to thereby bring about an in-focus state. Also, the adjusting device is a driving mechanism for driving the projecting optical system in the direction of the optical axis thereof in conformity with an output from a distance measuring sensor or the above-described condition detection device, and can be made into a construction which drives, for example, the whole of the projecting optical system or the focusing lens in the direction of the optical axis thereof by an actuator such as a motor.

Also, in the above-described embodiment, the controller, when it is limiting the display of the input image signal during the operation of the distance measuring sensor or the condition detection device, outputs a predetermined setting signal to the image display device (liquid crystal panel), which in turn displays the image of the setting signal. The setting signal can be made into a signal by which the liquid crystal panel assumes a state in which it displays an image of a substantially uniform color light such as, for example, a white screen (normally white screen), a gray screen or a blue screen (blue back screen).

(Second Embodiment)

A second embodiment of the present invention will now be described with reference to the drawings.

Figure 5:
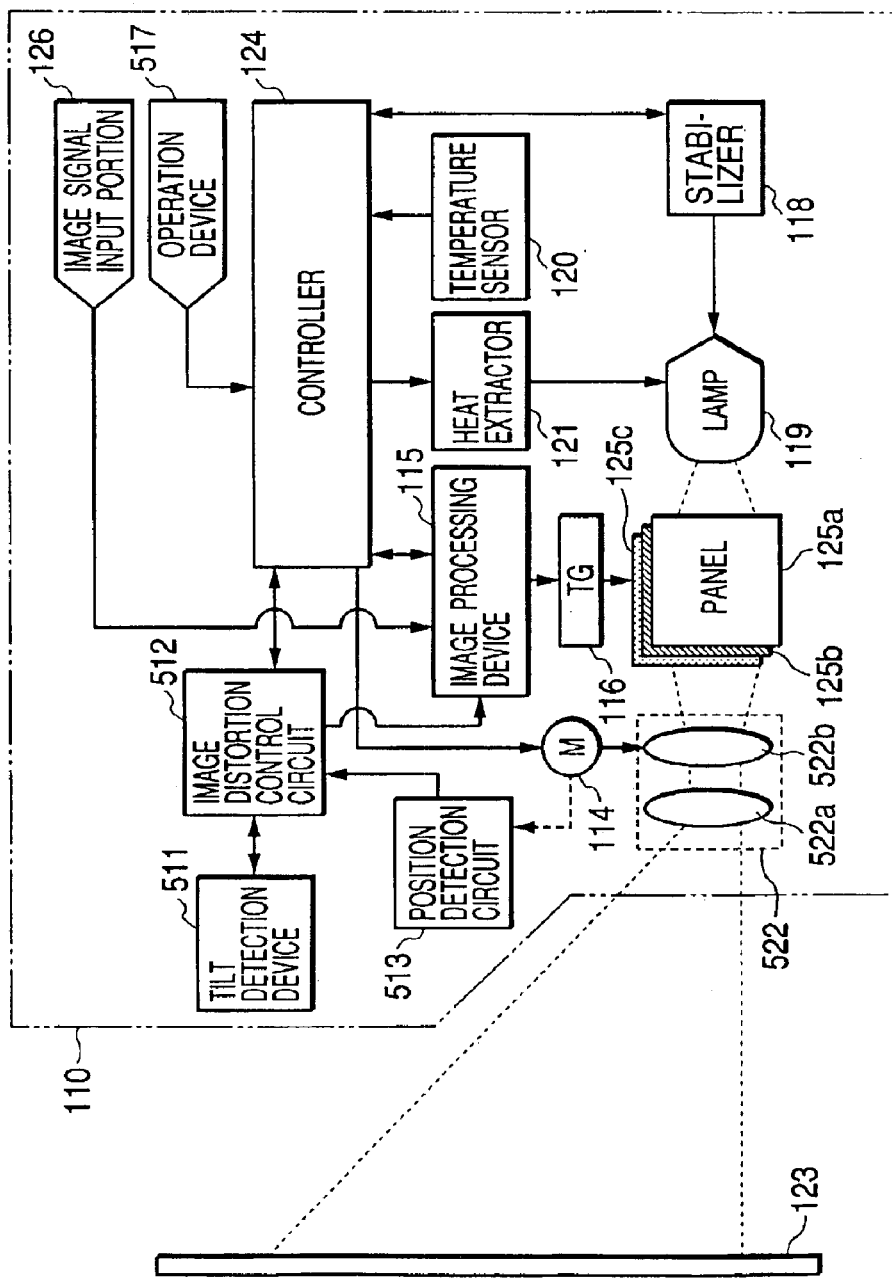
FIG. 5 is a block diagram showing the construction of a projector apparatus which is a second embodiment of the present invention.
Figures 6, 6A:
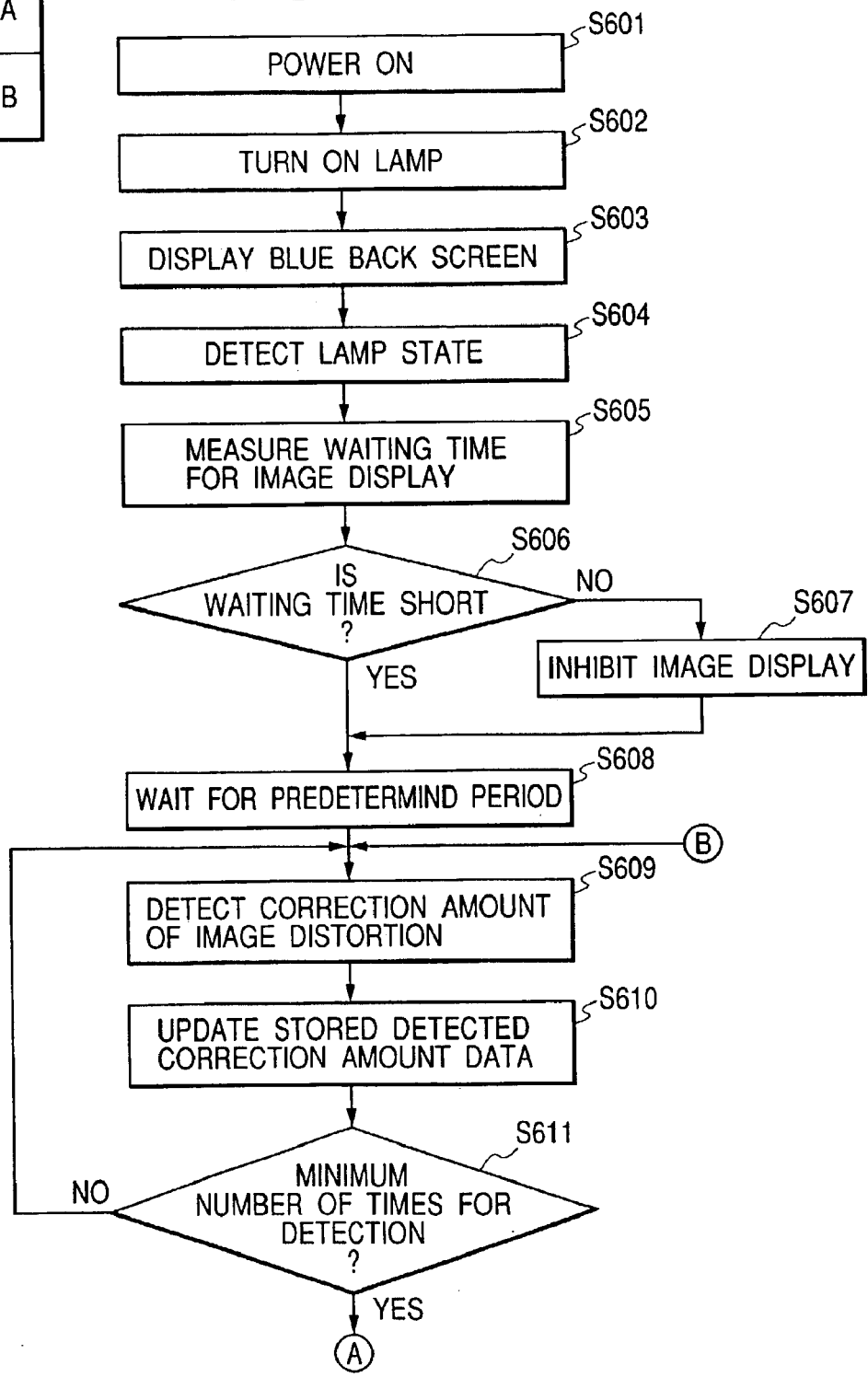
FIG. 6 is comprised of FIGS. 6A and 6B illustrating flow charts showing the operation of the projector apparatus which is the second embodiment of the present invention.
Figure 6B:
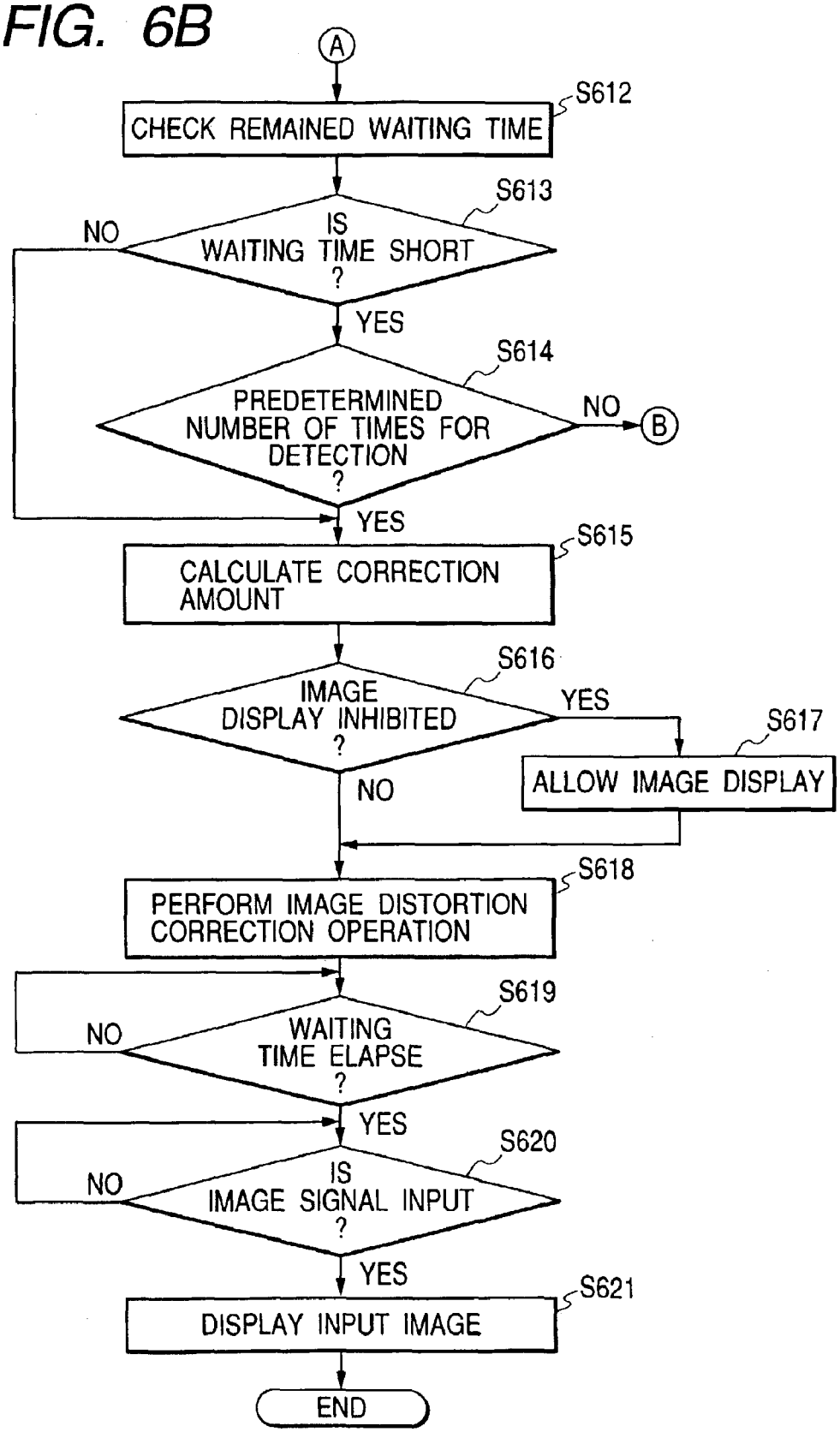
Figure 7A:
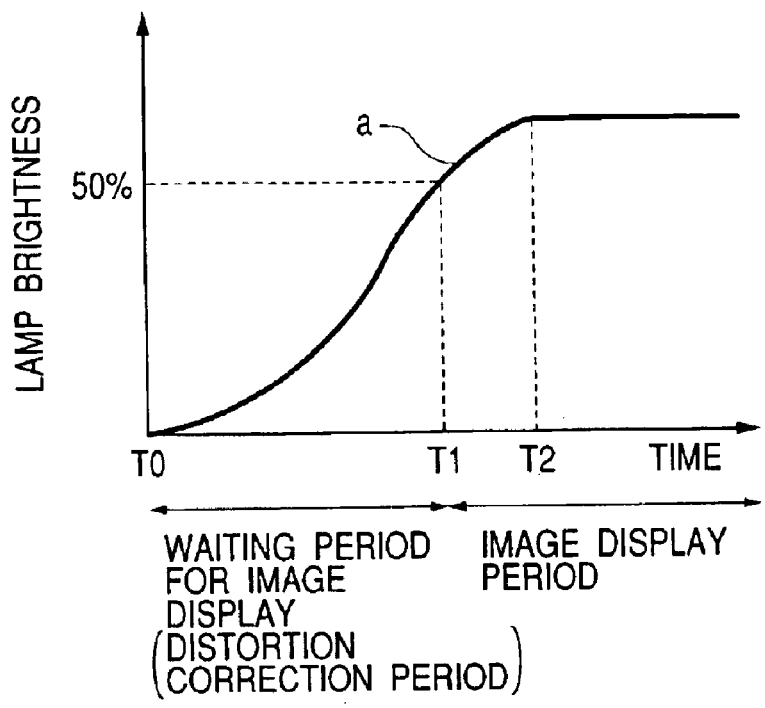
FIGS. 7A and 7B are graphs for illustrating changes in the brightness and temperature of the lamp of the projector apparatus which is the second embodiment.
Figure 7B:
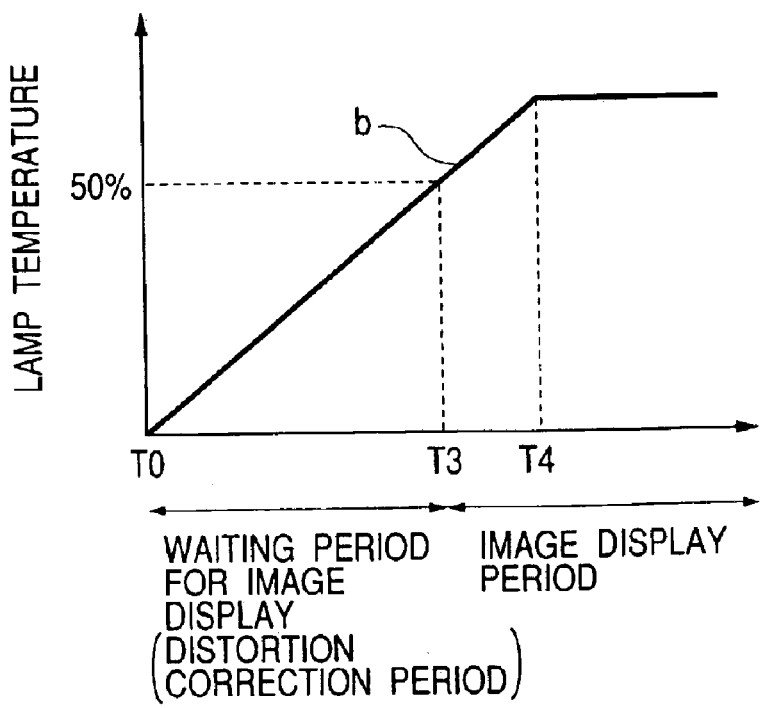
Figure 8A:
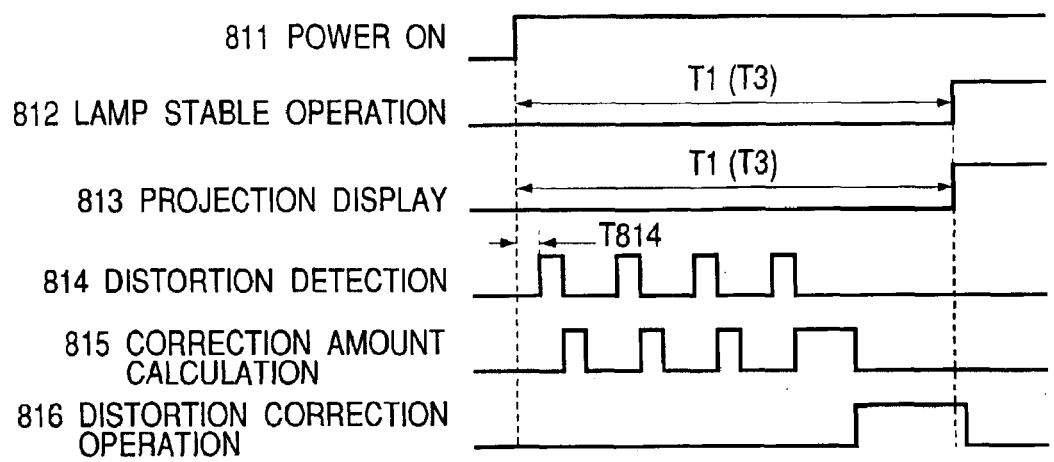
FIGS. 8A and 8B are timing charts showing the operation of the projector apparatus which is the second embodiment of the present invention.
Figure 8B:
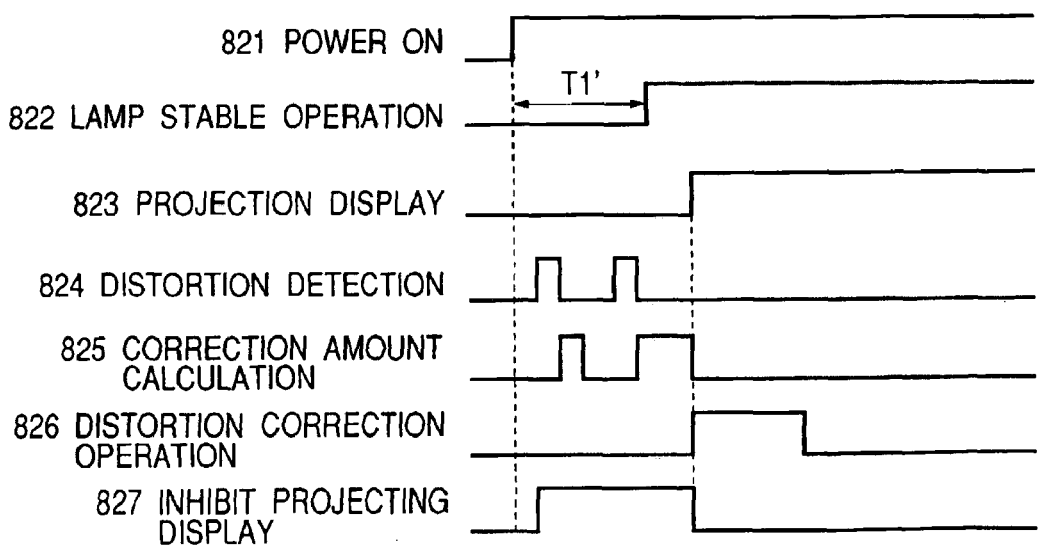
Figure 9:
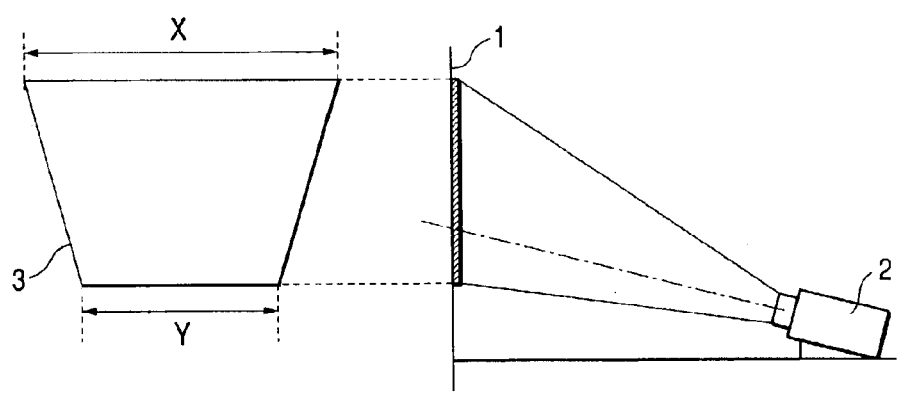
FIG. 9 is a view for illustrating the installed state of a projector apparatus and a projected image thereby.

FIG. 5 is a block diagram showing the construction of the second embodiment of the present invention, FIGS. 6A and 6B are flow charts for illustrating the operation of the second embodiment of FIG. 5, FIGS. 7A and 7B are graphs for illustrating changes in the state of a light source, and FIGS. 8A and 8B are timing charts showing the control timing of the embodiment of FIG. 5. In FIG. 5, constituents common to those in FIG. 1 are given the same reference characters and need not be described.

In FIG. 5, the reference numeral 511 designates a tilt detection device (tilt sensor) for detecting the installation angle of the projector apparatus 110 with respect to the screen 123, as an example of the condition detection device for detecting a condition related to an image to the screen 123. The tilt detection device 511 is comprised, for example, of a gravity acceleration sensor. The gravity acceleration sensor can detect with a vertical direction from the ground as a gravity amount (±1 g) and with a horizontal direction as a gravity amount (0 g) and therefore, can detect a tilt amount which is medium therebetween as a tilt angle (θ) by function calculation. The greater is the installation angle of the projector apparatus 110, the greater becomes the distortion of a projected image onto the screen 123.

The reference numeral 522 denotes a projection lens which is a projecting optical system, and it has a focusing lens 522a and a zoom lens 522b. Here, the greater is the tilt amount of the installation of the projector apparatus 110, the greater becomes the distortion of the projected image onto the screen 123 when the zoom position of the zoom lens 522b is changed.

The reference numeral 513 designates a zoom position detection circuit (encoder) for detecting the change amount (zoom position) of the zoom lens 522b, and the angle of rotation of a zoom driving motor 514 can be detected by the zoom position detection circuit 513 to thereby detect a zoom driving position.

The amount of distortion of the image projected onto the screen 123 can be calculated by an image distortion control circuit 512 comprised of a microcomputer by the use of tilt amount information from the tilt detection device 511 and zoom position information from the zoom position detection circuit 513 to thereby obtain the foreseen value of a correction amount for correcting image distortion (e.g. trapezoidal distortion). The image distortion control circuit 512 calculates a distortion correction amount (trapezoidal distortion (keystone) correction amount) from the obtained projection distortion amount, effects the signal processing (signal conversion for correction) of an image signal in an image processing device 515 in conformity with the information of this correction amount, executes the deformation of an output image and partial focal length change, and carries out the correction of the trapezoidal distortion.

The image processing device 515 is a circuit including a decoder for synchronously separating an image signal inputted from the image signal input portion 126, a frame memory and a scan converter, and further including a blue back generation circuit, an on-screen display (OSD) circuit for causing a character to be displayed, and an image signal switch for changing over an image signal and a blue back signal, and effecting, besides signal processing for trapezoidal distortion correction, digital processing such as the color correction of the image signal.

The reference numeral 517 denotes an operation device having a power source switch for effecting the ON/OFF of a power source, a correction operating switch for activating an image distortion correcting operation, a focus switch for performing a power focus operation, a zoom switch for performing a zooming operation, an adjusting operation portion for effecting image adjustment such as the adjustment of the color, brightness or the like of an image, a changeover switch for changing over the connected state of the image signal input portion 126, etc.

The specific operation of the projector according to the second embodiment will now be described with reference to FIGS. 6, 7A, 7B, 8A and 8B.

In FIGS. 6A and 6B, when the power source switch of the operation device 517 is closed (power source ON) (step (hereinafter referred to as S) 601), the controller 124 is activated, and the controller 124 operates the stabilizer 118, generates a high lamp turning-on voltage necessary to turn on the lamp 119, and applies the voltage to the electrode of the lamp, whereby the turning-on of the lamp is started (S602). Thereafter, the blue back signal is selected in the image processing device 515 and this blue back signal is outputted to the liquid crystal panel 125, and the liquid crystal panel 125 displays a blue back screen during the waiting time till the display of the input image (S603). Next, the state of the illuminating lamp 119 is detected (S604), and the waiting time till the display of the input image is measured (S605). More specifically, the output of the temperature sensor 120 disposed near the illuminating lamp 119 is detected for a predetermined period, and the time until a predetermined temperature (stable temperature) is reached is calculated from the inclination of the temperature rise of the obtained output to thereby measure the waiting time till the display of the input image (S604, S605). Here, as the above-mentioned waiting time, a predetermined time (tens of seconds, e.g. 30 seconds) having taken the stable state of the quantity of light of the illuminating lamp 119 into account may be predetermined.

In the present embodiment, it is a feature to detect an insufficient period (waiting time) during which the state of the illuminating lamp 119 is a state in which the quantity of light is small, and perform the tilt detecting or image distortion correcting operation during the waiting period till the display of the input image.

The relations among the waiting time till the display of the input image, the brightness of the lamp and the temperature of the lamp will now be described with reference to FIGS. 7A and 7B.

FIG. 7A shows the brightness change characteristic "a" from the start (T0) of the turning-on of the illuminating lamp 119 until the brightness of the illuminating lamp 119 becomes high with the lapse of time and soon reaches a saturation point (T2). The display of the input image is unnecessary when the brightness of the illuminating lamp 119 is insufficient, and for example, before the time (T1) when brightness of e.g. about 50% is achieved before the saturation point (T2) of brightness is reached, a predetermined non-input image (an image by a setting image signal preset in the image processing device 515) such as a blue back signal or a character is projected, and after predetermined brightness (T1) is reached, the display of the input image by the image signal from the image signal input portion 126 is started.

FIG. 7B shows the temperature change characteristic "b" from the start (T0) of the turning-on of the illuminating lamp 119 until the temperature of the vicinity of the illuminating lamp 119 rises with the lapse of time, is cooled by the heat extractor 121 such as a cooling fan, and reaches a saturation point (stable temperature) (T4). As can be understood from FIGS. 7A and 7B, the brightness change characteristic "a" and the temperature change characteristic "b" are in a substantially equal relation and therefore, the detection of any change in the brightness of the illuminating lamp 119 can be substituted for by measuring (detecting) the temperature of the vicinity of the illuminating lamp 119. Accordingly, the display of the input image is unnecessary when the temperature of the illuminating lamp 119 is insufficient, and before the time (T3) when a temperature of e.g. about 50% is achieved before predetermined brightness, for example, the saturation point (T4) of temperature is reached, a predetermined non-input image such as a blue back signal or a character is projected, and after a predetermined temperature (T3) is reached, the display of the input image by the image signal from the image signal input portion 126 is started.

Further, the timing charts of FIGS. 8A and 8B show the timing at which the controller 124 reads the output signal of the temperature sensor 120 from the closing (811) of the power source switch of the operation device 517, judges the stable state of the brightness of the illuminating lamp 119 (812), and starts the display of the input image (813).

Next, turning back to the flow chart of FIGS. 6A and 6B, as described above, at S605, the waiting time is found by the controller 124, whereafter the controller 124 starts to count down the waiting time.

Next, whether the waiting time found by the controller 124 is a time sufficiently long (enough) relative to the operation time for which the tilt angle is measured by the tilt detection device 511 is confirmed (S606). If the waiting time is a time longer than the time necessary for the tilt angle measuring operation, the tilt detection device 511 and the image distortion control circuit 512 take a processing waiting time (predetermined time) for which a detecting operation is not performed for several seconds (S608). This is because if the closing of the power source switch is the first closing of the power source switch after the installation of the projector apparatus 110, the possibility of changing the installed position of the projector apparatus 110 is high and therefore, it is better to start the tilt angle detecting operation after the installed position has been decided. FIG. 8A shows the timing at which the tilt angle detecting operation is started after the lapse of a predetermined time (T814) from the closing of the power source switch.

Turning back to the flow chart of FIGS. 6A and 6B, if at S606, the waiting time is a short time equal to or less than the waiting time (T814) for the tilt angle detecting operation shown in FIG. 8A, the controller 124 fixes the input signal changeover switch of the image processing device 515 to the non-input image signal output side until it allows the display of the input image after the termination of the tilt angle detecting operation, inhibits the projection of the input image (limits (inhibits) the inputting of the image signal from the image signal input portion 126), and continues to project a predetermined non-input image such as a blue back signal or a character (S607). Thereafter, a detecting operation waiting time of several seconds is taken before the tilt angle detecting operation (S608).

Next, the image distortion control circuit 512 detects the tilt amount information of the projector apparatus 110 from the tilt detection device 511 and the zoom position information from the zoom position detection circuit 513, and foresees and detects the image distortion correction amount of the trapezoidal distortion or the like of the image (S609). The obtained correction amount is stored in a memory (not shown) in the image distortion control circuit 512. Further the detection of the correction amount is repeated and correction data is averaged and calculated, and the value of the correction data improved in reliability is updated on the memory (S610) Thereafter, whether a minimum number of repetition times for correction amount detection has been reached is confirmed (S611), and if the minimum number of repetition times for correction amount detection is not reached, return is made to S609. The minimum number of repetition times for correction amount detection is preset and the correction amount detection is repeated, for example, 10 times. If at S611, the minimum number of repetition times for correction amount detection is reached, next the remainder of the waiting time is again read out from the controller 124 (S612), and whether the remainder of the waiting time is sufficient is confirmed (S613), and if there is a sufficient remaining time to further execute correction amount detection, whether the correction amount detecting operation has reached a preset number of times for correction amount detection (e.g. 30 times) is confirmed (S614). If it has not reached the preset number of times for correction amount detection, return is made to S609, where the correction amount detecting operation is performed, and the updating of the correction data is effected (S610) The operations of S609 to S614 are repeated until the number of times for correction amount detection satisfies e.g. 30 times, thereby further averaging and calculating the correction data, and the value of the correction data more improved in reliability is updated on the memory.

Soon the remainder of the input image display waiting time becomes null (S613) or satisfies the number of times for correction amount detection (S614), whereupon correction amount detection is terminated, and the final image distortion (trapezoidal distortion) correction amount is found on the basis of the reliable correction data averaged from on the memory (S615). Next, whether the display of the image signal from the image signal input portion 126 is inhibited is confirmed (S616). This is for confirming whether the input signal changeover switch of the image processing device 515 has been fixed to the non-input signal output side to thereby inhibit the projection of the input image when the time till the input image display waiting time is a short time equal to or less than the correction amount detecting operation waiting time (T814). If the projection has been inhibited, a projection allowing signal for releasing this and allowing the projection of the input image is transmitted to the image processing device 515, whereby the image processing device 515 changes over the input signal changeover switch to thereby change over from a state in which the blue back signal set at S603 is outputted to a state in which the image signal from the image signal input portion 126 is inputted and the input image is displayed (S617), and advance is made to S618. Also, if at S616, a state in which image display is not inhibited is detected (again at this time, the blue back image is being displayed), advance is made to S618.

Next, the image processing device 515 is controlled in accordance with the previously found image distortion correction amount to thereby execute the deformation of the output image and partial focal length change and carry out image distortion (trapezoidal distortion) correction (S618).

The hitherto state of things will be further described with reference to the timing charts of FIGS. 8A and 8B.

FIG. 8A shows the manner in which when the temperature of the illuminating lamp 119 after the closing of the power source switch of the projector apparatus is low and there is a sufficient time (tens of seconds, e.g. 30 seconds) until the input image is displayed, image distortion correction control is effected after a predetermined number of correction amount detecting operations, whereafter the input image by the image signal from the image signal input portion 126 is displayed.

It represents a timing chart until after the closing of the power source switch (811), the brightness or temperature of the illuminating lamp 119 is detected (812), the waiting time until the input image is projected and displayed is measured (T1), a predetermined number of times of correction amount detection (814) and correction calculation (815) are repeated, and the input image is projected and displayed (813) during image distortion correction control (816).

Also, FIG. 8B shows the manner in which even when the temperature of the illuminating lamp 119 after the closing of the power source switch of the projector apparatus is high and the input image can be displayed in a short time, image distortion correction control is started and the input image is displayed after a minimum predetermined number of times of correction amount detection has been executed.

It represents a timing chart for detecting the brightness or temperature of the illuminating lamp 119 (822) after the closing of the power source switch (821), measuring the waiting time until the input image is projected and displayed (T1'), once inhibiting the projection of the input image (827), then repeating a minimum number of times of correction amount detection (824) and correction calculation (825), starting the projection of the input image, and effecting image distortion correction control (826).

Turning back to the flow chart of FIGS. 6A and 6B, if at S616, a state in which image display is not inhibited is detected, when at S618, the image distortion correction controlling operation is being executed (the distortion correction controlling operation may be completed), the controller 124 confirms whether the waiting time till input image display has been up (S619), and if the waiting time is up, whether there is an image signal from the image signal input portion 126 is confirmed (S620), and if there is the image signal, the controller 124 changes over the input signal changeover switch of the image processing device 515 to thereby change over from a state in which the blue back signal set at S603 is outputted to a state in which the image signal from the image signal input portion 126 is inputted, and the image of that image signal is projected and displayed (S621).

Also, if at S616, image display is inhibited, at S617, changeover is made to a state in which the image signal from the image signal input portion 126 is inputted, and the image of that image signal is displayed and at S618, the image distortion correction controlling operation is started. When at S618, the image distortion correction controlling operation is being executed, the controller 124 confirms whether the waiting time has been up (S619), and if the waiting time is up (this case is a state in which from the time of S606, there is not the waiting time), whether there is the input of the image signal from the image signal input portion 126 is confirmed (S620), and if there is the input of the image signal (this case is a state in which from the time of S617, the image signal is inputted), the image of the image signal is projected (S621).

Here, design may be made such that in the above-described operation, the distortion correction amount is found at S615, and then the image distortion correction controlling operation of S618 is performed and after the correction is completed, the confirmation of the inhibition of image display and the inhibition releasing operation at S616 and S617 are performed.

As described above, in the above-described second embodiment, design is made such that after the closing of the power source switch of the projector apparatus, the state of the illuminating lamp is detected and if the temperature (brightness) of the illuminating lamp is low and the waiting time until the illuminating lamp assumes a stable state is long (a time for which the tilt angle detecting operation can be sufficiently performed), the tilt angle detecting operation is performed during the waiting time, and if the temperature (brightness) of the illuminating lamp is high and the waiting time until the illuminating lamp assumes a stable state is short (a time for which the tilt angle detecting operation cannot be sufficiently performed), the input display of the image signal is inhibited (limited) and the tilt angle detecting operation is performed during the period for which the input display is inhibited, and the image of the image signal inputted after the completion of the image distortion correction controlling operation or during the image distortion correction controlling operation is projected and displayed and therefore, after the closing of the power source switch of the projector apparatus, the image distortion correction controlling operation is automatically performed, and the operability of the projector apparatus can be improved. Also, the display of an unnecessary image during the distortion correcting operation can be effected for a short time or cannot be effected, and in a short time after the closing of the power source switch of the projector apparatus, the user can appreciate a good image free of distortion.

While in each of the above-described embodiments, the focus adjusting operation and the image distortion correcting operation have been described as discrete embodiments, the present invention is not restricted to these embodiments, but there may be adopted a construction in which the focus adjusting operation and the image distortion correcting operation are performed at a time during the waiting time till the image display by the input image signal after the closing of the power source switch of the projector apparatus. In such an embodiment wherein the focus adjusting operation and the image distortion correcting operation are performed at a time, design is made such that after the closing of the power source switch of the projector apparatus, the state of the illuminating lamp is detected and if the temperature (brightness) of the illuminating lamp is low and the waiting time until the illuminating lamp assumes a stable state is long (a time for which the tilt angle and distance detecting operation can be sufficiently performed), the tilt angle and distance detecting operation is performed during the waiting time, and if the temperature (brightness) of the illuminating lamp is high and the waiting time until the illuminating lamp assumes a stable state is short (a time for which the tilt angle and distance detecting operation cannot be performed), the input display of the image signal is inhibited (limited) and the tilt angle and distance detecting operation is performed during the period for which the input display is inhibited, and the image of the image signal inputted after the completion of the image distortion correction controlling operation and the focus state adjusting operation or during the image distortion correction controlling operation and during the focus state adjusting operation is projected and displayed and therefore, after the closing of the power source switch of the projector apparatus, the image distortion correction controlling operation and the focus adjusting operation are automatically performed and the operability of the projector apparatus can be improved. Also, the display of an unnecessary input image during the distortion correcting operation and the focus adjusting operation can be effected for a short time, and in a short time after the closing of the power source switch of the projector apparatus, the user can appreciate a good in-focus image free of distortion (an image by the input image signal).

As described above, according to the above-described embodiments, there can be provided a projection type display apparatus in which after the closing of the power source switch of the display apparatus, the focus adjusting operation or the image distortion correcting operation, the focus adjusting operation and the image distortion correcting operation are automatically performed and the operability of the display apparatus can be improved, and the display of an unnecessary image during the focus adjusting operation or the image distortion correcting operation can be effected for a short time or cannot be effected.

What is claimed is:

1. A projection type display apparatus for projecting an image onto a surface of a screen, comprising:
    an image display device illuminated by illuminating light from a light source and for displaying an image thereon;
    a projecting optical system for projecting the image from said image display device onto the surface of said screen;
    a condition detection device for detecting a condition related to said image;
    an adjusting device for adjusting the condition of said image in conformity with an output of said condition detection device;
    an operation device for effecting ON/OFF of a power source of said projection type display apparatus; and
    a controller for causing said condition detection device to be operated and limiting the inputting of an input image signal to said image display device when the power source of said projection type display apparatus is switched on by said operation device.

2. An apparatus according to claim 1, wherein said condition detection device is a distance measuring device for measuring a distance between said screen and said projection type display apparatus, and said adjusting device is a driving mechanism for driving at least a part of said projecting optical system in the direction of an optical axis thereof in conformity with an output from said distance measuring device.

3. An apparatus according to claim 1, wherein said condition detection device is an angle detecting device for detecting an installation angle of said projection type display apparatus, said adjusting device is an image processing device for converting and processing said input image signal in conformity with an output from said angle detecting device, and said image processing device conversion-processes said input image signal so as to correct trapezoidal deformation of the image projected onto said screen.

4. An apparatus according to claim 1, wherein said condition detection device is a distance measuring device for measuring a distance between said screen and said projection type display apparatus and an angle detecting device for detecting an installation angle of said projection type display apparatus, said adjusting device is a driving mechanism for driving at least a part of said projecting optical system in the direction of an optical axis thereof in conformity with an output from said distance measuring device, and an image processing device for converting and processing said input image signal in conformity with an output from said angle detecting device, and said image processing device converts and processes said input image signal so as to correct trapezoidal deformation of the image projected onto said screen.

5. An apparatus according to claim 1, wherein said controller inputs a predetermined setting signal to said image display device when it is limiting the inputting of the input image signal to said image display device, said condition detection device is a contrast detecting device for detecting the contrast of the image on said screen, and said adjusting device is a driving mechanism for driving at least a part of said projecting optical system in the direction of an optical axis thereof in conformity with an output from said contrast detecting device.

6. An apparatus according to claim 1, wherein said controller inputs a predetermined setting signal to said image display device when it limits the inputting of the input image signal to said image display device, said condition detection device is a phase difference detecting device for detecting a phase difference of the image on said screen, and said adjusting device is a driving mechanism for driving at least a part of said projecting optical system in the direction of an optical axis thereof in conformity with an output from said phase difference detecting device.

7. A projection type display apparatus for projecting an image onto a surface of a screen, comprising:
an image display device illuminated by illuminating light from a light source, and for displaying an image thereon;
a light source condition detection device for detecting any change in the condition of said light source;
a waiting time measuring device for measuring a waiting time until said light source becomes a predetermined condition on the basis of an output of said light source condition detection device;
a projecting optical system for projecting the image from said image display device onto the surface of said screen;
a condition detection device for detecting a condition related to said image;
an adjusting device for adjusting the condition of the image in conformity with an output of said condition detection device;
an operation device for effecting ON/OFF of a power source of said projection type display apparatus; and
a controller for finding, when the power source of said projection type display apparatus is switched on by said operation device, the waiting time until said light source assumes the predetermined stable condition by said waiting time measuring device on the basis of an output of said light source condition detection device, and causing said condition detection device to be operated during said waiting time.

8. An apparatus according to claim 7, wherein said condition detection device is a distance measuring device for measuring a distance between said screen and said projection type display apparatus, and said adjusting device is a driving mechanism for driving at least a part of said projecting optical system in the direction of an optical axis thereof in conformity with an output from said distance measuring device.

9. An apparatus according to claim 7, wherein said condition detection device is an angle detecting device for detecting an installation angle of said projection type display apparatus, said adjusting device is an image processing device for converting and processing said input image signal in conformity with an output from said angle detecting device, and said image processing device converts and processes said input image signal so as to correct trapezoidal deformation of the image projected onto said screen.

10. An apparatus according to claim 7, wherein said condition detection device is a distance measuring device for measuring a distance between said screen and said projection type display apparatus, and an angle detecting device for detecting an installation angle of said projection type display apparatus, said adjusting device is a driving mechanism for driving at least a part of said projecting optical system in the direction of an optical axis thereof in conformity with an output from said distance measuring device, and an image processing device for converting and processing said input image signal in conformity with an output from said angle detecting device, and said image processing device converts and processes said input image signal so as to correct trapezoidal deformation of the image projected onto said screen.

11. An apparatus according to claim 7, wherein said controller limits the inputting of the input image signal to said image display device during said waiting time.

12. An apparatus according to claim 11, wherein said controller inputs a predetermined setting signal to said image display device when it is limiting the inputting of the input image signal to said image display device, said condition detection device is a contrast detecting device for detecting contrast of the image on said screen, and said adjusting device is a driving mechanism for driving at least a part of said projecting optical system in the direction of an optical axis thereof in conformity with an output from said contrast detecting device.

13. An apparatus according to claim 11, wherein said controller inputs a predetermined setting signal to said image display device when it is limiting the inputting of the input image signal to said image display device, said condition detection device is a phase difference detecting device for detecting a phase difference of the image on said screen, and said adjusting device is a driving mechanism for driving at least a part of said projecting optical system in the direction of an optical axis thereof in conformity with an output from said phase difference detecting device.

14. An apparatus according to claim 11, wherein when said controller is limiting the inputting of said input image signal during said waiting time, if said waiting time is exceeded before an output is obtained from said condition detection device, said controller limits the inputting of said input image signal to said image display device until said output is obtained, and allows the inputting of said input image signal to said image display device when said output is obtained.

15. An apparatus according to claim 11, wherein when said controller is limiting the inputting of said input image signal during said waiting time, if said waiting time is exceeded before an output from said condition detection device is obtained, said controller limits the inputting of said input image signal to said image display device until said output is obtained, allows the inputting of said input image signal to said image display device when said output is obtained, and adjusts the condition of the projected image in conformity with said output through said adjusting device.

16. An apparatus according to claim 7, wherein said light source condition detection device is a temperature change detecting device for detecting any change in the temperature of said light source, and said waiting time measuring device foresees and calculates the time until said light source reaches a stable temperature, on the basis of a plurality of informations about a temperature change during a predetermined period, from said temperature change detecting device, thereby finding the waiting time.

17. An apparatus according to claim 16, wherein said temperature change detecting device serves also as a brightness change detecting device.

* * * * *